(12) United States Patent
Yanagisawa et al.

(10) Patent No.: US 8,111,188 B2
(45) Date of Patent: Feb. 7, 2012

(54) RADAR SYSTEM

(75) Inventors: Wasuke Yanagisawa, Tokyo (JP); Ryo Horie, Tokyo (JP); JunXiang Ge, Tokyo (JP)

(73) Assignee: Yokowo Co., Ltd, Tokyo (JP)

( * ) Notice: Subject to any disclaimer, the term of this patent is extended or adjusted under 35 U.S.C. 154(b) by 221 days.

(21) Appl. No.: 12/594,121

(22) PCT Filed: Mar. 4, 2008

(86) PCT No.: PCT/JP2008/054249
§ 371 (c)(1),
(2), (4) Date: Jan. 4, 2010

(87) PCT Pub. No.: WO2008/126539
PCT Pub. Date: Oct. 23, 2008

(65) Prior Publication Data
US 2010/0134347 A1 Jun. 3, 2010

(30) Foreign Application Priority Data
Mar. 30, 2007 (JP) ................................. 2007-091358

(51) Int. Cl.
*G01S 7/28* (2006.01)
(52) U.S. Cl. .......................... 342/202; 342/198; 342/175
(58) Field of Classification Search .......... 342/200–204, 342/70–72, 198, 195, 175
See application file for complete search history.

(56) References Cited
U.S. PATENT DOCUMENTS
3,237,130 A * 2/1966 Cohn ............................ 333/115
3,525,993 A 8/1970 Peace et al.
(Continued)

FOREIGN PATENT DOCUMENTS
EP 2141509 A1 * 1/2010
(Continued)

OTHER PUBLICATIONS
Yoshida, T., "Radar Engineering Revised Edition," The Institute of Electronics, Information and Communication Engineers, Oct. 1, 1996, pp. 74-75, and pp. 175-177.
(Continued)

*Primary Examiner* — John Sotomayor
(74) *Attorney, Agent, or Firm* — Ingrassia Fisher & Lorenz, P.C.

(57) ABSTRACT

To provide a smaller radar system having a simple structure with as small number of component parts as possible at a lower cost as compared to conventional ones. A radar system 1 including a 3 dB coupler 5 having four terminals, and a pulse generator 8. A first terminal 51 of the 3 dB coupler 5 is supplied with an output signal from a high frequency oscillator 2 while a second terminal 52 of the 3 dB coupler 5 is connected to a transmitting and receiving antenna 4. Third and fourth terminals 53 and 54 of the 3 dB coupler 5 are connected to two-state devices 6, 7, respectively, which are in impedance mismatched only for a predetermined period of time to totally reflect the signal from the 3 dB coupler 5 and are in impedance matched during the time period other than the predetermined time to direct a signal from the 3 dB coupler 5 to a subsequent electronic circuit. The pulse generator 8 causes the two-state devices 6, 7 to be impedance mismatched at the time of transmission and causes the two-state devices 6, 7 to be impedance matched at the time of reception.

20 Claims, 7 Drawing Sheets

U.S. PATENT DOCUMENTS

| | | | | |
|---|---|---|---|---|
| 3,824,592 | A * | 7/1974 | Mehltretter | 342/128 |
| 4,014,021 | A * | 3/1977 | Fournier et al. | 342/88 |
| 4,065,768 | A | 12/1977 | Kondoh et al. | |
| 4,207,547 | A * | 6/1980 | Buck | 333/209 |
| 4,286,260 | A * | 8/1981 | Gershberg et al. | 340/554 |
| 4,492,960 | A | 1/1985 | Hislop | |
| 4,521,779 | A * | 6/1985 | Lewis | 342/194 |
| 4,857,935 | A * | 8/1989 | Bates | 342/128 |
| 5,153,596 | A * | 10/1992 | Stove | 342/175 |
| 6,225,943 | B1 * | 5/2001 | Curley et al. | 342/137 |
| 6,426,716 | B1 * | 7/2002 | McEwan | 342/28 |
| 6,639,543 | B2 * | 10/2003 | Puglia | 342/70 |
| 7,006,033 | B2 * | 2/2006 | Ishii et al. | 342/127 |
| 7,602,333 | B2 * | 10/2009 | Hiramatsu et al. | 342/175 |
| 2010/0134347 | A1 * | 6/2010 | Yanagisawa et al. | 342/202 |

FOREIGN PATENT DOCUMENTS

| | | | |
|---|---|---|---|
| JP | 04-232883 A | | 8/1992 |
| JP | 06-510127 A | | 11/1994 |
| JP | 09-257909 A | | 10/1997 |
| JP | 2003-194917 A | | 7/2003 |
| JP | 2006-177983 A | | 7/2006 |
| JP | 2008249498 A | * | 10/2008 |

OTHER PUBLICATIONS

European Patent Office, European Search Report for European Application No. 08721665.1, dated Feb. 28, 2011.

* cited by examiner

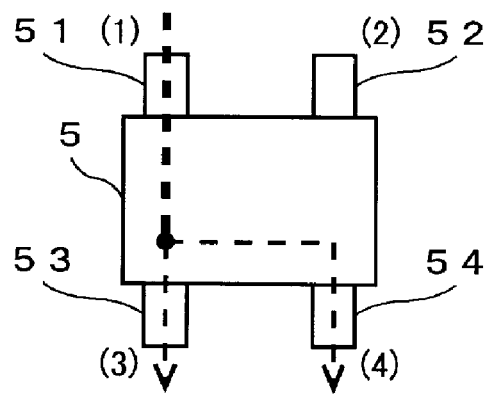
F I G. 2a
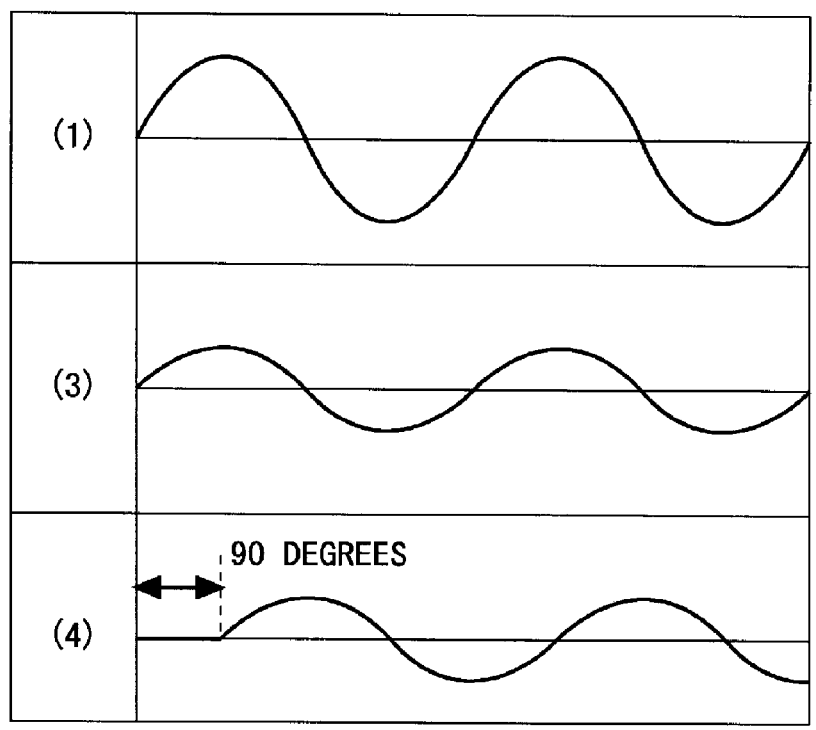
F I G. 2b

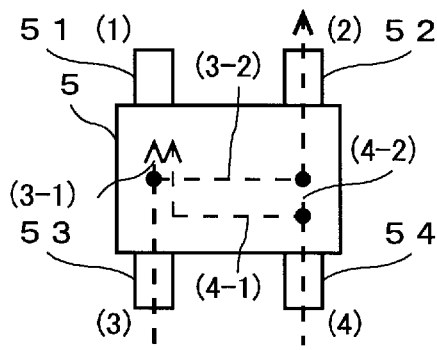
F I G. 3a
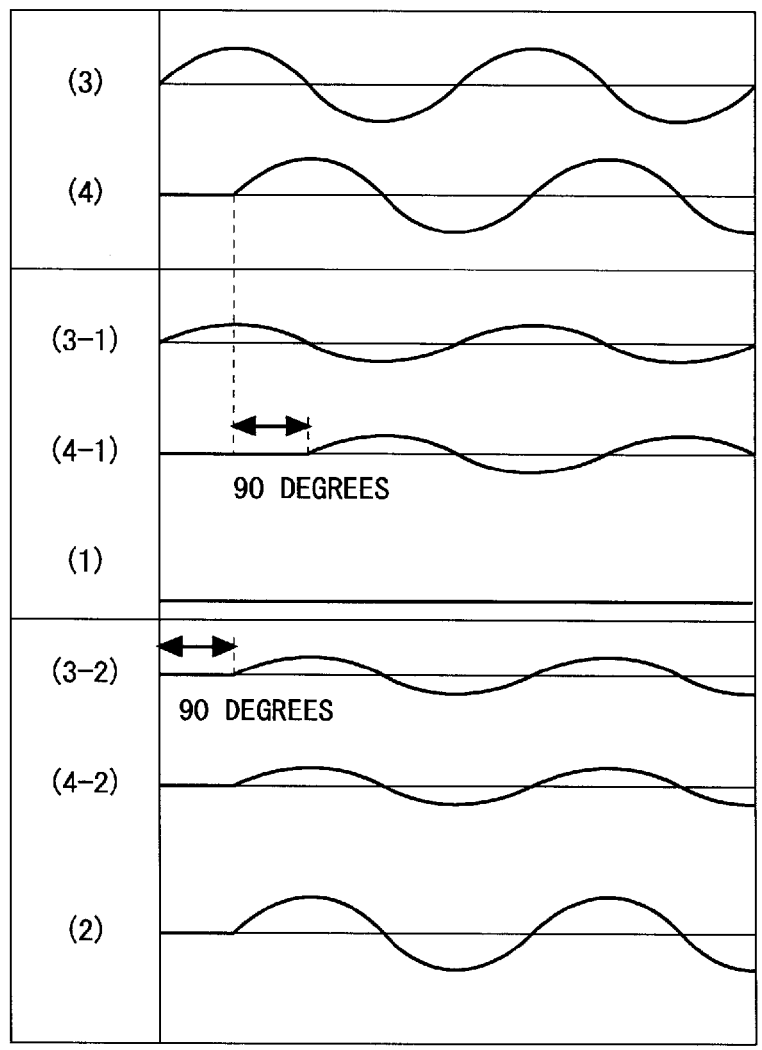
F I G. 3b

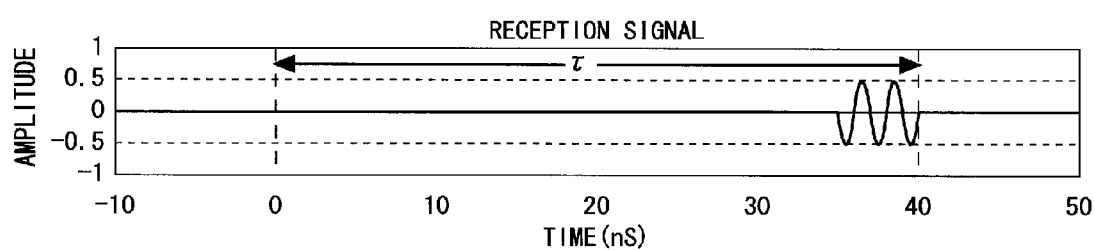
F I G. 6a
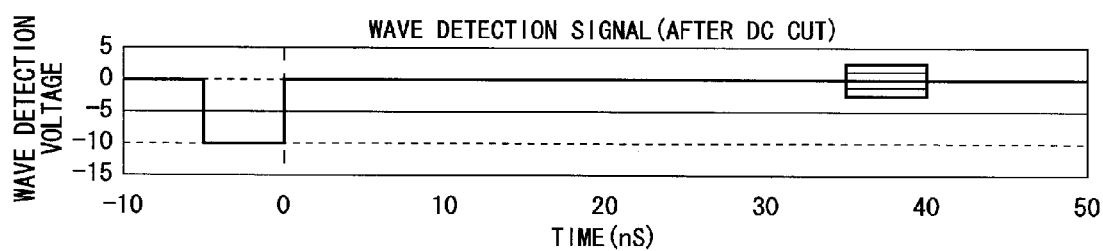
F I G. 6b

RADAR SYSTEM

CROSS-REFERENCE TO RELATED APPLICATIONS

This application is a U.S. National-Stage entry under 35 U.S.C. §371 based on International Application No. PCT/JP2008/054249, filed Mar. 4, 2008, which was published under PCT Article 21(2) and which claims priority to Japanese Application No. 2007-91358, filed Mar. 30, 2007, which are all hereby incorporated in their entirety by reference.

TECHNICAL FIELD

The present invention relates to a radar system having a small detectable range, such as an on-vehicle millimeter-wave radar.

BACKGROUND OF THE INVENTION

A pulse-type radar system emits a sequence of pulses as transmission waves after being modulated to have a predetermined frequency and receives reflected waves which are reflections of the transmission waves from an object. The system then determines distance to the object by measuring the time it takes for the reflected waves to return. The pulse-type radar system uses high frequency signals in which different frequencies are used respectively for transmission and reception to determine a differential frequency as an intermediate frequency signal. The distance to the object is measured by means of calculating the time it takes for the intermediate frequency signal to have its maximum amplitude. See Takashi YOSHIDA, "Radar Engineering Revised Edition", The Institute of Electronics, Information and Communication Engineers, Oct. 1, 1996, p. 74-75 and p. 175-177 (YOSHIDA).

Some pulse-type radar systems utilize heterodyne detection in which a high frequency oscillator is used for both the transmission unit and the reception unit. Heterodyne radars require a lot of millimeter-wave components such as a circulator or a directional coupler, to deal with millimeter-wave signals. Heterodyne radars use two high frequency oscillators and use a lot of millimeter-wave heterodyne radars, which limits miniaturization and cost reduction of the radar.

Thus, some radars use a homodyne detector in which a signal from a single high frequency oscillator is modulated in a transmission unit and is also used for a frequency conversion in a reception unit. Homodyne radar systems share a signal from a single high frequency oscillator for both the transmission unit and the reception unit, so that they can be reduced in size and costs in comparison with heterodyne radar systems. Japanese Patent Laid-open No. 2006-177983 shows a homodyne pulse radar system.

Pulse radar according to Japanese Patent Laid-open No. 2006-177983 emits a high frequency signal converted by means of ASK (amplitude shift keying) technique with a high speed square wave signal. The converted output is then reflected from an object as reflected wave. The reflected wave is used as a reception signal. Then logical AND operation is performed on the reception signal and a gating signal which is a delayed result of the high speed square wave signal. A delay time of the gating signal at which the maximum output level is obtained represents a delayed time of the reception signal. The distance to the object is calculated according to this delay time Conventional homodyne radar systems can be practically reduced in size and cost than heterodyne radar systems. However, even in the radar system according to Japanese Patent Laid-open No. 2006-177983, there are two line units for both the transmission and reception. A number of parts are still required. This can complicate the structure or reduce the yield of good products.

An object of the present invention is to provide a smaller radar system with the reduced number of component parts as much as possible which can easily be structured at lower cost than in conventional systems. Furthermore, other desirable features and characteristics of the present invention will become apparent from the subsequent detailed description of the invention and the appended claims, taken in conjunction with the accompanying drawings and this background of the invention.

SUMMARY OF THE INVENTION

A radar system according to the present invention that solves the aforementioned problem has a 3 dB coupler or a four-terminal device having functions equivalent thereto, and a pulse generator. A first terminal of said four-terminal device is supplied with an output signal from a transmitting and receiving high frequency oscillator. A second terminal of said four-terminal device is connected to a transmitting and receiving antenna. A third terminal and a fourth terminal of said four-terminal device are connected to two-state devices, respectively, each of the two-state devices being adapted to totally reflect a signal from said four-terminal device when it is impedance mismatched only for a predetermined period of time, and to direct the signal from said four-terminal device to a subsequent electronic circuit during the time period other than the predetermined period of time when it is impedance matched. Said pulse generator causes said two-state device to be impedance mismatched at the time of transmission and causes said two-state device to be impedance matched at the time of reception.

At the time of transmission, a signal supplied from the high frequency oscillator through the first terminal is directed to the third terminal and the fourth terminal with a phase difference by 90 degrees, but no signal is directed to the second terminal. Since the two-state device is in impedance mismatched, the signals emitted to the third and fourth terminals are substantially totally reflected. However, the signals directed to the first terminal are cancelled when being composed, because of the 180-degree phase difference. The signals directed to the second terminal are composed in phase and directed to the antenna without being cancelled. The thus composite signal is emitted from the antenna. As used herein, the term "substantially totally reflected" refers to total reflection or near total reflection.

At the time of reception, each of the two-state devices is in impedance matched, so that the signal received from the antenna through the second terminal is directed to the third and fourth terminals with a difference in phase by 90 degrees.

The signal received from the antenna is subjected to homodyne detection by using an output from the high frequency oscillator supplied through the first terminal from, for example, the high frequency oscillator. A high frequency signal for a Q channel is obtained from the third terminal while a high frequency signal for an I channel is obtained from the fourth terminal.

Said pulse generator may cause said two-state devices to be impedance mismatched when a signal capable of conveying binary digits has either value and cause said two-state devices to be impedance matched when the signal has the other value. With this configuration, the radar system operates as transmission mode when the signal capable of conveying binary digits has either value, and operates reception mode when the signal has the other value.

According to the present invention, the four-terminal device and the two-state devices are used to change the signal paths either for transmission or reception. This makes it possible to provide a simple radar system with a less number of component parts as compared to conventional ones, reducing size and cost of the radar system. In addition, the system is simple in structure with a less number of component parts, so that it can be expected to improve the yields of good products.

BRIEF DESCRIPTION OF THE DRAWINGS

The present invention will hereinafter be described in conjunction with the following drawing figures, wherein like numerals denote like elements.

FIG. 2a is a diagrammatic representation showing how a signal received through a first terminal is emitted through third and fourth terminals;

FIG. 2b is a timing chart corresponding to FIG. 2a;

FIG. 3a is a diagrammatic representation showing how signals received through third and fourth terminals are emitted through the first and second terminals;

FIG. 3b is a timing chart corresponding to FIG. 3a;

FIG. 4b is a timing chart corresponding to FIG. 4a

FIG. 6a is an illustrative diagram showing a waveform of a reception signal;

FIG. 6b is an illustrative diagram showing a waveform of a detected signal;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Now, an embodiment in which the present invention is applied to a radar system using millimeter-wave band is described in detail with reference to the drawings.

Figure 1:
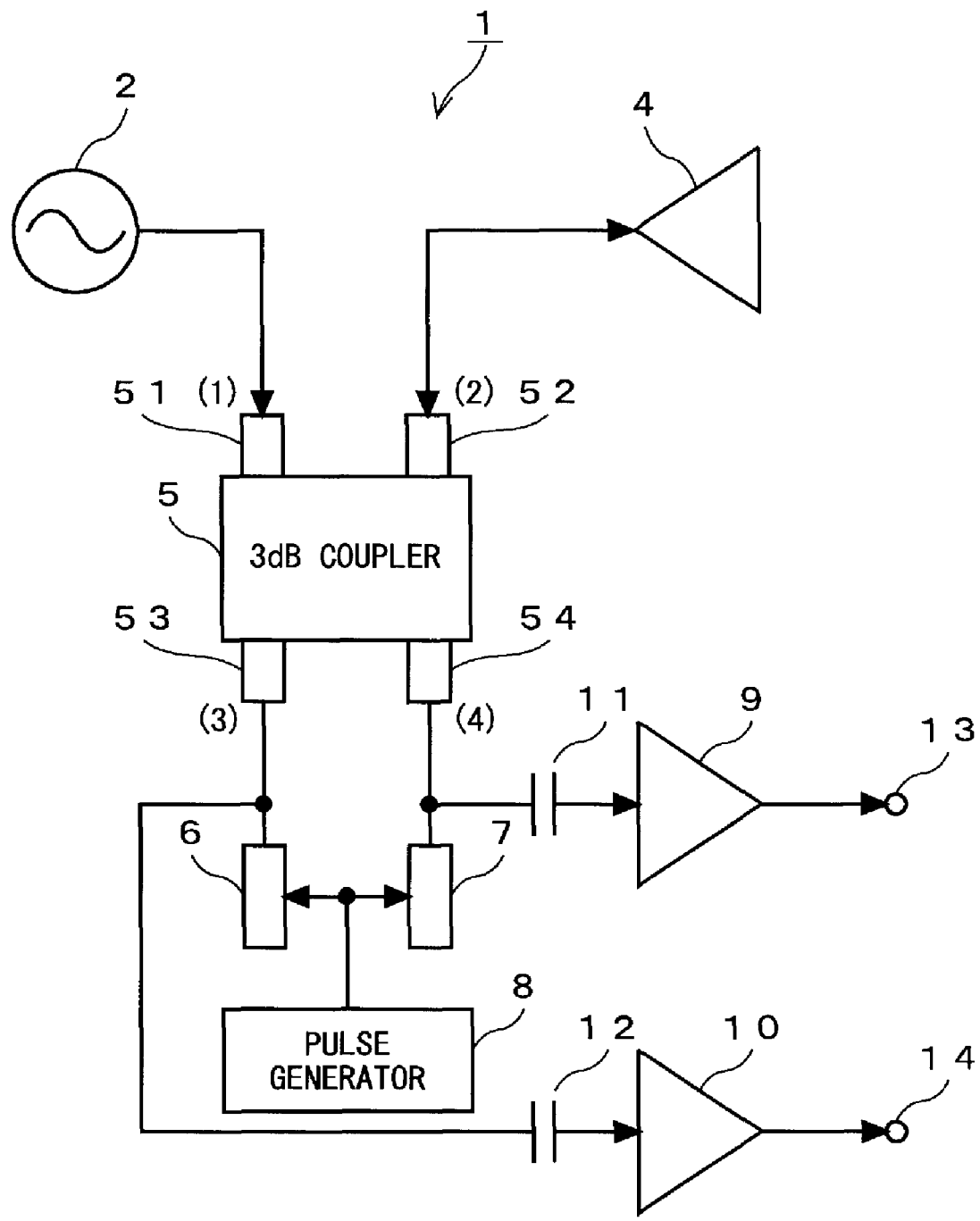
FIG. 1 is a configuration diagram showing a radar system according to the present embodiment.

FIG. 1 is a configuration diagram showing a radar system 1 according to the present embodiment.

The radar system 1 comprises a high frequency oscillator 2 for transmission and reception, a transmitting and receiving antenna 4, a 3 dB coupler 5, two-state devices 6, 7, a pulse generator 8, amplifiers 9, 10, capacitors 11, 12, and output terminals 13, 14. At least the 3 dB coupler 5, the two-state devices 6, 7 and the pulse generator 8 are contained in a same container or housing. This radar system 1 can be used as, for example, a short-range radar that can be mounted on a vehicle. A reception signal obtained from the radar system 1 is supplied to a subsequent electronic circuit (not shown) through the output terminals 13, 14. The subsequent electronic circuit performs operations such as calculation of distance to an object according to the reception signal.

The high frequency oscillator 2 generates a millimeter-wave signal and supplies it to the 3 dB coupler 5. The millimeter-wave signal is used for emission at the time of transmission and is used for homodyne detection at the time of reception.

The transmitting and receiving antenna 4 emits, as transmission waves, a transmission signal supplied from the 3 dB coupler 5 at the time of transmission. At the time of reception, it receives reflected waves generated when the transmission waves reflect from the object. The reflected waves are supplied to the 3 dB coupler 5 as a reception signal.

The 3 dB coupler 5 is a very small four-terminal device which can easily be mounted on a substrate in the container or the housing. It comprises first through fourth terminals 51 to 54. Signals received through the first terminal 51 and the second terminal 52 are output through the third terminal 53 and the fourth terminal 54, respectively, as signals shifted in phase by 90 degrees from each other and having power that is one half of the original. Likewise, signals received through the third terminal 53 and the fourth terminal 54 are output through the first terminal 51 and the second terminal 52, respectively, as signals shifted in phase by 90 degrees from each other and having power that is one half of the original. No signal is exchanged between the first terminal 51 and the second terminal 52, and between the third terminal 53 and the fourth terminal 54.

The first terminal 51 is supplied with a millimeter-wave signal from the high frequency oscillator 2. The second terminal 52 is connected to the transmitting and receiving antenna 4. At the time of transmission, the second terminal 52 sends a transmission signal to the transmitting and receiving antenna 4. At the time of reception, the second terminal 52 is supplied with a reception signal from the transmitting and receiving antenna 4. The third and fourth terminals 53, 54 are connected to the two-state devices 6, 7, respectively.

The two-state devices 6, 7 are alternately matched and mismatched in impedance in relation to the third and fourth terminals 53, 54, respectively, of the 3 dB coupler 5. The two-state devices 6, 7 always have the same impedance state with respect to each other. The pulse generator 8 generates pulses representing two states for controlling the impedance condition of the two-state devices 6, 7, and for alternately changing it between the impedance matched state and the impedance mismatched state.

When the two-state devices 6, 7 are in the impedance matched state, signals output through the third and fourth terminals 53, 54 of the 3 dB coupler 5 are supplied to the amplifiers 9, 10. This state represents reception mode. When the two-state devices 6, 7 are in the impedance mismatched state, the signals output through the third and fourth terminals 53, 54 of the 3 dB coupler 5 are substantially totally reflected. This state represents transmission mode.

In order to change the impedance states between transmission and reception, the pulse generator 8 controls the impedance state by using a signal capable of conveying binary digits (hereinafter, referred to as a "pulse signal"). For example, the pulse generator 8 uses the pulse signal to turn the two-state devices 6, 7 into the impedance mismatched state for one of the binary digits and make the two-state devices 6, 7 be impedance matched for the other of the binary digits.

In this embodiment, the pulse generator 8 is directly connected to the two-state devices 6, 7. However, the pulse generator 8 may be provided in the circuit at any different positions as long as it is connected to the two-state devices 6, 7 via direct-current connection. For example, the circuit may be configured by using a micro-strip line or a coaxial line to pass through the 3 dB coupler 5 via direct-current connection. With this configuration, the pulse generator 8 may be connected to the first terminal 51 of the 3 dB coupler 5.

The two-state devices 6, 7 may be implemented by using, for example, a Schottky barrier diode. The pulse generator 8 serves to apply an appropriate voltage to the anode terminal and the cathode terminal of the Schottky barrier diode to establish and break electrical continuity. For example, the pulse signal is supplied to the cathode terminal of the Schottky barrier diode in which the anode terminal is grounded and the cathode terminal is connected to the third and fourth terminals 53, 54 of the 3 dB coupler 5. When the pulse signal has a logic low level, the forward bias is produced across the Schottky barrier diode, which establishes electrical continuity to provide the impedance matched state. When the pulse signal has a logic high level, the reverse bias is produced across the Schottky barrier diode, which breaks the electrical continuity into the impedance mismatched state.

The amplifiers 9, 10 amplify the signals received through the third and fourth terminals 53, 54 of the 3 dB coupler 5 by a predetermined amplification factor to send the amplified signals to the subsequent electronic circuit. The capacitors 11, 12 block the DC component of the signals supplied through the third and fourth terminals 53, 54 and send the resulting signals to the amplifiers 9, 10.

Next, detailed operation of the 3 dB coupler 5 is described.

FIG. 2*a* is a diagrammatic representation showing how a signal received through the first terminal 51 is directed to the third and fourth terminals 53, 54. FIG. 2*b* is a timing chart corresponding to FIG. 2*a*. The signal received through the first terminal 51 is directed to the third and fourth terminals 53, 54 as signals that are shifted in phase by 90 degrees from each other. The signal output through the fourth terminal 54 is delayed by 90 degrees with respect to the signal output through the third terminal 53. The power of the signals output through the third and fourth terminals 53, 54 is one half of the power of the signal supplied to the first terminal 51.

FIG. 3*a* is a diagrammatic representation showing how the signals received through the third and fourth terminals 53, 54 are directed to the first and second terminals 51, 52. FIG. 3*b* is a timing chart corresponding to FIG. 3*a*. The signals are received through the third and fourth terminals 53, 54 when the two-state devices 6, 7 are in the impedance mismatched state. As apparent from the above, this occurs only during the transmission. Thus, the devices are generally in the state shown in FIGS. 3*a* and 3*b* after the state shown in FIGS. 2*a* and 2*b*.

In FIGS. 3*a* and 3*b*, signals (3) and (4) are supplied to the third and fourth terminals 53, 54, respectively. The signals (3) and (4) in FIG. 3*b* are total reflections of the signals (3) and (4) in FIG. 2*b*. Thus, the signals (3) and (4) supplied to the third and fourth terminals 53, 54 are shifted in phase by 90 degrees from each other.

At the first terminal 51, the signal (4) is shifted in phase by another 90 degrees with respect to the signal (3). For example, the signal (3) is directed into the first terminal 51 as a signal (3-1). The signal (4), which is delayed in phase by 90 degrees, is directed to the first terminal 51 as a signal (4-1). The signals (3) and (4) already have a 90-degree phase difference to which another 90-degree phase difference is added to produce the signals (3-1) and (4-1) to the 180-degree phase difference in total. In addition, the power of the signal (3) is identical to that of the signal (4). The power of the signal (3-1) is one half of the power of the signal (3) or (4) and is identical to that of the signal (4-1). The signals (3-1) and (4-1) are cancelled out each other because they are in antiphase and have the same power, so that no signal is directed to the first terminal 51.

At the second terminal 52, the signal (3) has no phase difference with respect to the signal (4). For example, the signal (3) is directed to the second terminal 52 as a signal (3-2) that is delayed in phase by 90 degrees. The signal (4) is directed to the second terminal 52 as a signal (4-2). The signal (4) is delayed in phase by 90 degrees with respect to the signal (3), and the signal (3) is delayed in phase by 90 degrees as the signal (3-2). This means that the signal (3-2) is in phase with respect to the signal (4-2). In addition, the power of the signal (3) is identical to that of the signal (4). The power of the signal (3-2) is one half of the power of the signal (3) or (4) and is identical to the power of the signal (4-2). The signal (3-2) and the signal (4-2) are in phase, and have the same power, so that a composite signal enhanced with each other is obtained from the second terminal 52.

Figure 4A:
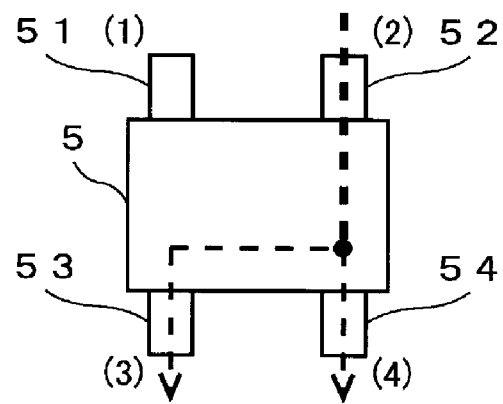
FIG. 4a is a diagrammatic representation showing how a signal received through a second terminal is emitted through third and fourth terminals.
Figure 4B:
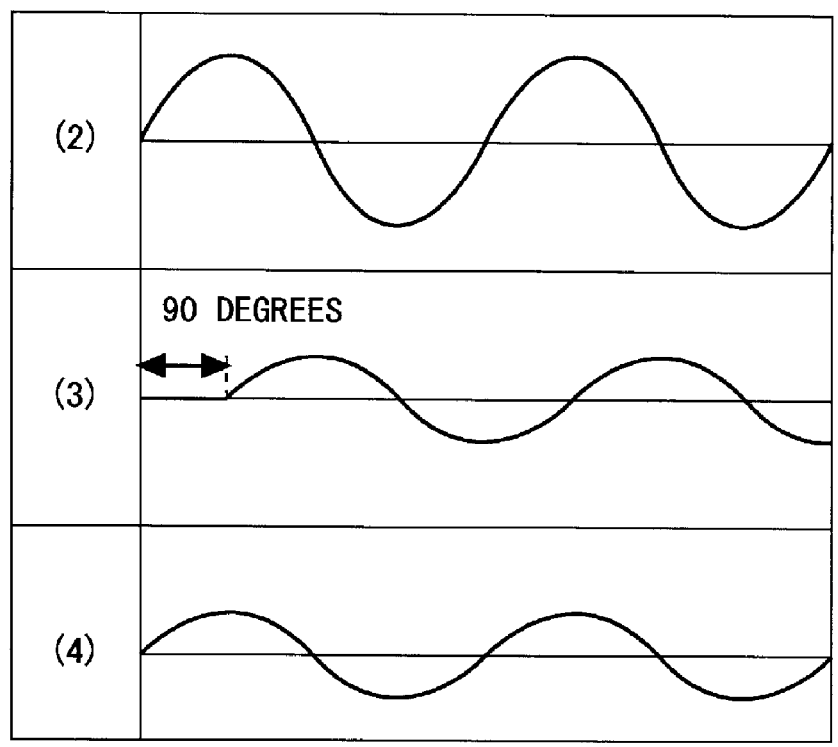

FIG. 4*a* is a diagrammatic representation showing how the signal received through the second terminal 52 is output through the third and fourth terminals 53, 54. FIG. 4*b* is a timing chart corresponding to FIG. 4*a*. The signal received through the second terminal 52 is directed to the third and fourth terminals 53, 54 as signals shifted in phase by 90 degrees from each other. The signal output through the third terminal 53 is delayed by 90 degrees with respect to the signal output through the fourth terminal 54. The power of the signals output through the third and fourth terminals 53, 54 is one half of the power of the signal supplied to the first terminal 51.

Operation of the radar system 1 with the aforementioned configuration is described with reference to FIGS. 5*a* through 5*c* and FIGS. 6*a* and 6*b*. FIGS. 5*a* through 5*c* and FIGS. 6*a* and 6*b* are illustrative diagrams showing waveforms at major parts of the radar system 1 at transmission mode and reception mode. It should be noted that the delay time for each circuit is previously adjusted.

The radar system 1 operates as follows at transmission mode.

First, a millimeter-wave signal (FIG. 5*a*) generated by the high frequency oscillator 2 is supplied to the first terminal 51 of the 3 dB coupler 5. The pulse generator 8 brings the two-state devices 6, 7 into the impedance mismatched state because the operation mode is for transmission. For example, the Schottky barrier diode in which the anode terminal is grounded and the cathode terminal is connected to the third and fourth terminals 53, 54 of the 3 dB coupler 5 is used for two-state device. The pulse signal (FIG. 5*b*) is supplied to the cathode terminal of the Schottky barrier diode. When the pulse signal has a logic high level (ΔT), the reverse bias is produced across the Schottky barrier diode to provide the impedance mismatched state. The millimeter-wave signal supplied to the first terminal 51 of the 3 dB coupler 5 is directed to the third and fourth terminals 53, 54, as shown in FIGS. 2*a* and 2*b*.

Figure 5A:
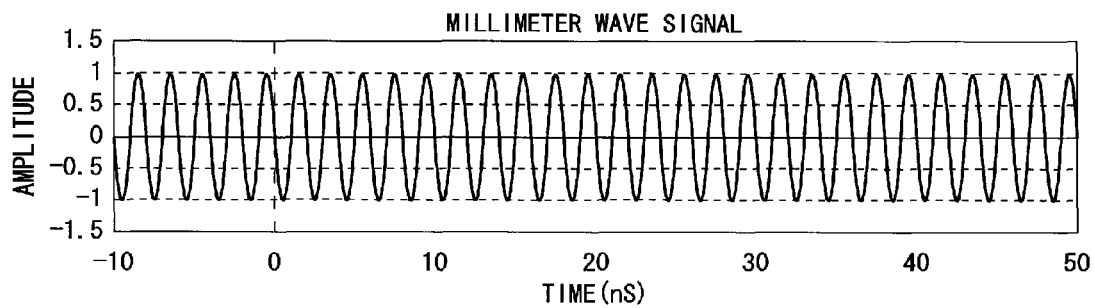
FIG. 5a is an illustrative diagram showing a waveform of a millimeter-wave signal.
Figure 5B:
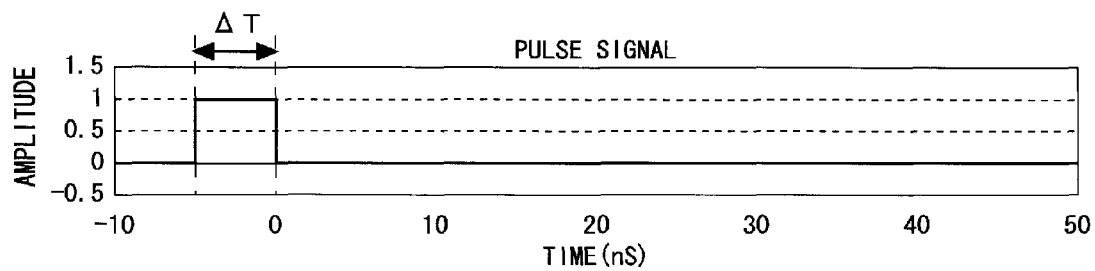
FIG. 5b is an illustrative diagram showing a waveform of a pulse signal.
Figure 5C:
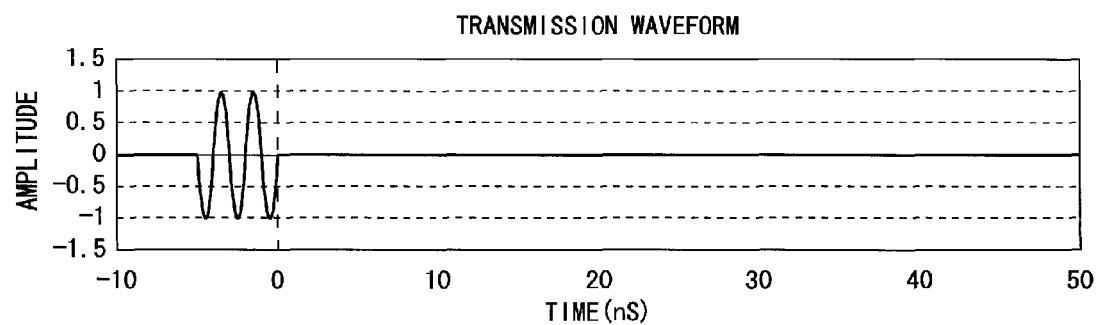
FIG. 5c is an illustrative diagram showing a transmission waveform.

Because the two-state devices 6, 7 are in the impedance mismatched state, the millimeter-wave signals obtained through the third and fourth terminals 53, 54 are substantially totally reflected and signals supplied from the third and fourth terminals 53, 54 are directed to the first and second terminals 51, 52. As shown in FIGS. 3*a* and 3*b*, in this case, the signal to the first terminal 51 is cancelled. On the other hand, the signal is output through the second terminal 52. The signal output through the second terminal 52 is supplied to the transmitting and receiving antenna 4 as a transmission signal. The transmitting and receiving antenna 4 emits the transmission signal as transmission waves (FIG. 5*c*). The transmission is thus performed. It should be noted that the waveform of the transmission wave is similar to the waveform obtained by modulating the millimeter-wave signal with the pulse signal. The radar system 1 serves as the pulse-type radar system.

The radar system 1 operates as follows at reception mode.

First, at least a part of the transmission waves (FIG. 5*c*) emitted during the operation at the time of transmission reflect from the object as the reflected waves. The transmitting and receiving antenna 4 receives the reflected waves. The received reflected waves are supplied to the second terminal 52 of the 3 dB coupler 5 as a reception signal (FIG. 6*a*).

The reception signal is delayed by $\tau=2R/C$ seconds with respect to the transmission waves, wherein R represents a distance from the transmitting and receiving antenna 4 to the object, and C represents a radio wave propagation velocity (ca. $3\times10^8$ m/s). When the impedance state of the two-state devices 6, 7 is changed according to the pulse signal from the pulse generator 8, the two-state devices 6, 7 are turned into the impedance matched state at the time when the reception signal arrives at the 3 dB coupler 5 if $\tau$ is larger than the signal width $\Delta T$ of the pulse signal. For example, the Schottky barrier diode in which the anode terminal is grounded and the cathode terminal is connected to the third and fourth terminals 53, 54 of the 3 dB coupler 5 is used for two-state device. The pulse signal is supplied to the cathode terminal of the Schottky barrier diode. The signal width of the pulse signal is smaller than $\tau$, so that it has a logic low level. Thus, the forward bias is produced across the Schottky barrier diode to provide the impedance matched state.

As described in conjunction with FIGS. 4*a* and 4*b*, the 3 dB coupler 5 supplies the reception signal to the third and fourth terminals 53, 54. The first terminal 51 of the 3 dB coupler 5 is provided with the millimeter-wave signal even at the time of reception. The millimeter-wave signal is, as described in conjunction with FIGS. 2*a* and 2*b*, supplied to the third and fourth terminals 53, 54. Thus, the reception signal is subjected to homodyne detection by the millimeter-wave signal. Since the two-state devices 6, 7 are in the impedance matched state, the detected reception signal is directed to the third and fourth terminals 53 and 54 as high frequency signals for a Q channel and an I channel, respectively.

The high frequency signal for the Q channel obtained from the third terminal 53 is supplied to the amplifier 10 via the capacitor 12 that breaks the direct current. It is then amplified by a predetermined amplification factor and is supplied through the output terminal 14 to the subsequent electronic circuit as a wave detection signal for the Q channel (FIG. 6*b*).

The high frequency signal for the I channel obtained from the fourth terminal 54 is supplied to the amplifier 9 via the capacitor 11 that obstructs passage of the direct current. It is then amplified by a predetermined amplification factor and is supplied through the output terminal 13 to the subsequent electronic circuit as a wave detection signal for the I channel (FIG. 6*b*).

The wave detection signals for the Q and I channels have a waveform as shown in FIG. 6*b*.

In the homodyne detection, Doppler beat is produced. The amplitude of the detected reception signal is determined depending on the phase relationships between the reception signal and the millimeter-wave signal supplied through the first terminal 51 of the 3 dB coupler 5. This is why a wave detection voltage is not determined at a certain point in FIG. 6*b*. In addition, as to the wave detection signal, no signal is supplied from the 3 dB coupler 5 to the amplifiers 9, 10 when the two-state devices 6, 7 are in the impedance mismatched state. When the two-state devices 6, 7 are implemented with a Schottky barrier diode, a pulse signal is given and it is supplied to the amplifiers 9, 10 via the capacitors 11, 12, respectively. Accordingly, the voltage of the wave detection signal is determined depending on the pulse signal when the two-state devices 6, 7 are in the impedance mismatched state. In FIG. 6*b*, it is $-10$ V.

In the subsequent electronic circuit, it is possible to determine the distance of the object, the traveling speed of the object, and the size of the object, from the wave detection signals for the Q and I channels.

The distance to the object can be determined in the wave detection signal shown in FIG. 6*b*, by means of measuring the time duration between the time when the wave detection voltage is changed by the pulse signal and the time when the wave detection voltage is changed by the reception signal. Since the wave detection voltage by the pulse signal is quite different from the wave detection voltage by the reception signal, they can readily be distinguished according to the wave detection voltage.

Figure 7A:
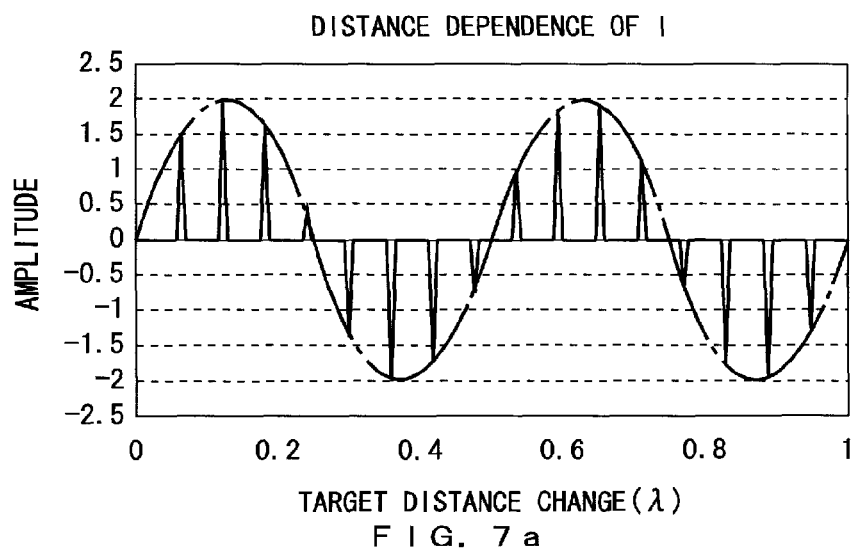
FIG. 7a is an illustrative diagram showing a Doppler beat signal for an I channel.
Figure 7B:
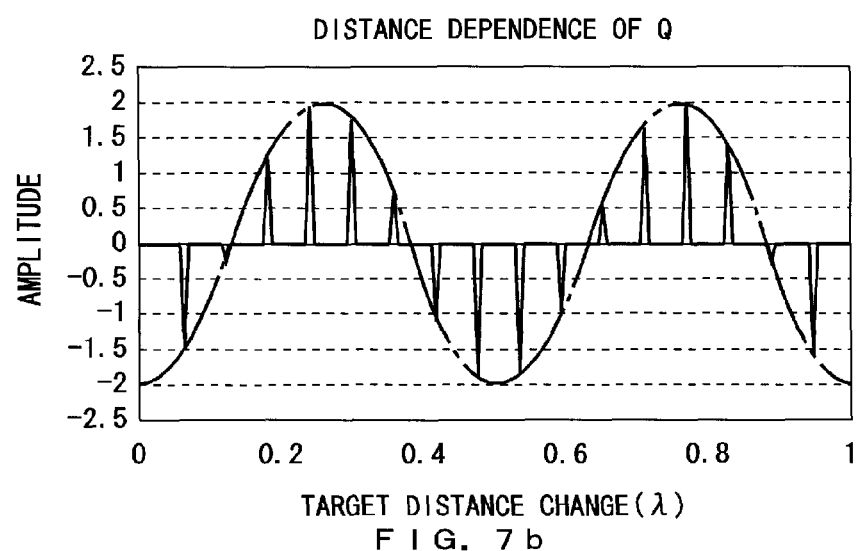
FIG. 7b is an illustrative diagram showing a Doppler beat signal for a Q channel.

FIG. 7*a* is an illustrative diagram showing a Doppler beat signal obtained according to the wave detection signal for the I channel and the distance to the object. FIG. 7*b* is an illustrative diagram showing a Doppler beat signal obtained according to the wave detection signal for the Q channel and the distance to the object. In FIGS. 7*a* and 7*b*, the solid line represents the Doppler beat signal while the dashed line represents an envelope thereof. The traveling speed of the object is determined according to the frequency of the Doppler beat signal for the I channel.

Figure 7C:
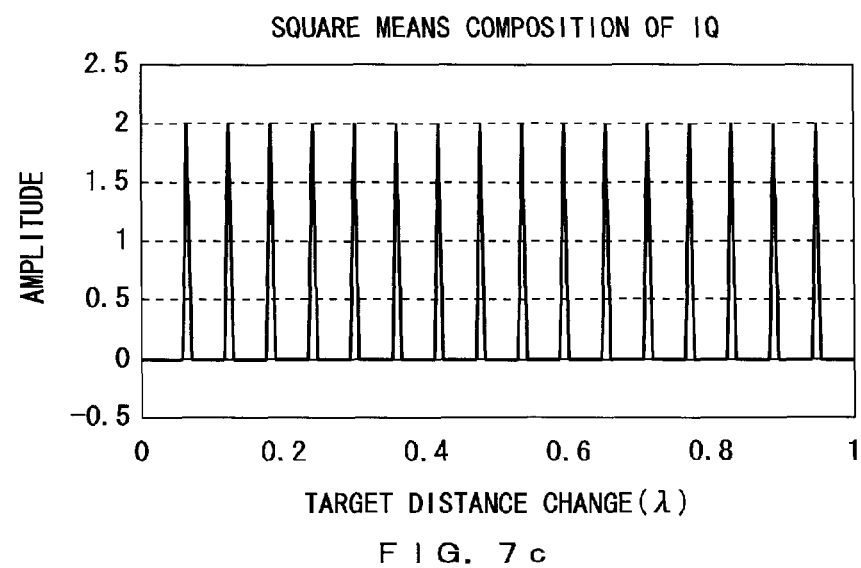
FIG. 7c is an illustrative diagram showing a composite waveform of square mean values of the Doppler beat signal for the I channel and the Doppler beat signal for the Q channel.

FIG. 7*c* is an illustrative diagram showing a composite waveform of square mean values of the Doppler beat signal for the I channel and the Doppler beat signal for the Q channel. The amplitude represents reflectivity of the transmission waves from the object, which indicates the size of the object.

The radar system 1 having the aforementioned configuration comprises a significantly less number of the component parts. This contributes to cost reduction and reduction in size. In addition, the system is simple in structure with a less number of component parts, so that it can be expected to improve the yields of good products.

Conventional homodyne radar systems use an output signal from a single high frequency oscillator is used for the transmission and reception. Therefore, the high frequency oscillator is required to be a high-power one because it should supply the necessary power to both the transmission unit and the reception unit. In the present embodiment, an output signal from the single high frequency oscillator 2 is time divided and individually supplied to the transmission unit and the reception unit at the time of transmission and reception, respectively. This makes it possible to reduce the output power of the high frequency oscillator 2 as compared to the conventional ones, achieving more efficient power consumption of a smaller system at a lower cost.

It should be understood that the present invention is not limited to the embodiment described above. For example, the 3 dB coupler 5 used in the present embodiment as the four-terminal device may be replaced with other component having similar functions. For example, a four-terminal hybrid coupler may be used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A radar system comprising a 3 dB coupler or a four-terminal device having functions equivalent thereto, and a pulse generator,
   a first terminal of said four-terminal device being supplied with an output signal from a transmitting and receiving high frequency oscillator;
   a second terminal of said four-terminal device being connected to a transmitting and receiving antenna,
   a third terminal and a fourth terminal of said four-terminal device being connected to two-state devices, respectively, each of the two-state devices being adapted to totally reflect a signal from said four-terminal device when it is impedance mismatched only for a predetermined period of time, and to direct the signal from said four-terminal device to a subsequent electronic circuit during the time period other than the predetermined period of time when it is impedance matched,
   said pulse generator being adapted to cause:
   said two-state device to be impedance mismatched at the time of transmission and said two-state device to be impedance matched at the time of reception.

2. The radar system as claimed in claim 1, wherein a reception signal from said antenna is subjected to homodyne detection by an output signal from said high frequency oscillator and the detected wave output is emitted through said third terminal and said fourth terminal at the time of reception.

3. The radar system as claimed in claim 1, wherein said four-terminal devices, said pulse generator and said two-state devices are contained in a single housing.

4. The radar system as claimed in claim 1, wherein said pulse generator causes said two-state devices to be impedance mismatched when a signal capable of conveying binary digits has either value and causes said two-state devices to be impedance matched when the signal has the other value.

5. The radar system as claimed in claim 2, wherein said four-terminal devices, said pulse generator and said two-state devices are contained in a single housing.

6. A radar system configured to be coupled to a high frequency oscillator and an antenna, the radar system comprising:
   a coupler comprising:
     a first terminal coupled to receive a first signal from the high frequency oscillator;
     a second terminal coupled to receive a second signal from the antenna;
     a third terminal coupled to the first terminal and the second terminal and configured to supply a third signal using the first signal, the second signal, or both; and
     a fourth terminal coupled to the first terminal and the second terminal and configured to supply a fourth signal using the first signal, the second signal, or both;
   a first two-state device coupled to the third terminal and configured to substantially totally reflect the third signal when the first two-state device is impedance mismatched and to direct the third signal to an electronic circuit when the first two-state device is not impedance matched;
   a second two-state device coupled to the fourth terminal and configured to substantially totally reflect the fourth signal when the second two-state device is impedance mismatched and to direct the fourth signal to the electronic circuit when the second two-state device is not impedance matched; and
   a pulse generator coupled to the first two-state device and the second two-state device and configured to cause the first two-state device and the second two-state device to be impedance mismatched at a time of transmission and to be impedance matched at a time of reception.

7. The radar system of claim 6, wherein the coupler comprises a 3 dB coupler.

8. The radar system of claim 6, further comprising:
   a housing, wherein the coupler, the first two-state device, the second two-state device, and the pulse generator are each disposed within the housing.

9. The radar system of claim 6, wherein the second terminal is further configured to:
   transmit a preliminary signal to the antenna; and
   receive the second signal from the antenna in response to the preliminary signal.

10. The radar system of claim 6, wherein:
    the third terminal is adapted to totally reflect the third signal when the first two-state device is impedance mismatched and to direct the third signal to the electronic circuit when the first two-state device is not impedance matched; and
    the fourth terminal is adapted to totally reflect the fourth signal when the second two-state device is impedance mismatched and to direct the fourth signal to the electronic circuit when the second two-state device is not impedance matched.

11. The radar system of claim 6, wherein:
    the third terminal is configured to supply the third signal using the first signal, and the fourth terminal is configured to supply the fourth signal using the first signal, when the coupler is in a transmission mode; and
    the third terminal is configured to supply the third signal using the second signal, and the fourth terminal is configured to supply the fourth signal using the second signal, when the coupler is in a reception mode.

12. The radar system of claim 6, wherein the coupler is further configured to subject the second signal to homodyne detection using the first signal.

13. The radar system of claim 12, further comprising:
    a housing, wherein the coupler, the first two-state device, the second two-state device, and the pulse generator are each disposed within the housing.

14. A radar system comprising:
    a high frequency oscillator;
    an antenna;
    a coupler comprising:
      a first terminal coupled to receive a first signal from the high frequency oscillator;
      a second terminal coupled to receive a second signal from the antenna;
      a third terminal coupled to the first terminal and the second terminal and configured to supply a third signal using the first signal, the second signal, or both; and
      a fourth terminal coupled to the first terminal and the second terminal and configured to supply a fourth signal using the first signal, the second signal, or both;
    a first two-state device coupled to the third terminal and configured to substantially totally reflect the third signal when the first two-state device is impedance mismatched and to direct the third signal to an electronic circuit when the first two-state device is not impedance matched;

a second two-state device coupled to the fourth terminal and configured to substantially totally reflect the fourth signal when the second two-state device is impedance mismatched and to direct the fourth signal to the electronic circuit when the second two-state device is not impedance matched; and a pulse generator coupled to the first two-state device and the second two-state device and configured to cause the first two-state device or the second two-state device to be impedance mismatched at a time of transmission and to be impedance matched at a time of reception.

15. The radar system of claim 14, wherein the coupler comprises a 3 dB coupler.

16. The radar system of claim 14, further comprising:
a housing, wherein the coupler, the first two-state device, the second two-state device, and the pulse generator are each disposed within the housing.

17. The radar system of claim 14, wherein the second terminal is further configured to:
transmit a preliminary signal to the antenna; and
receive the second signal from the antenna in response to the preliminary signal.

18. The radar system of claim 14, wherein:
the third terminal is adapted to totally reflect the third signal when the first two-state device is impedance mismatched and to direct the third signal to the electronic circuit when the first two-state device is not impedance matched; and
the fourth terminal is adapted to totally reflect the fourth signal when the second two-state device is impedance mismatched and to direct the fourth signal to the electronic circuit when the second two-state device is not impedance matched.

19. The radar system of claim 14, wherein the coupler is further configured to subject the second signal to homodyne detection.

20. The system of claim 14, wherein:
the third terminal is configured to supply the third signal using the first signal, and the fourth terminal is configured to supply the fourth signal using the first signal, when the coupler is in a transmission mode; and
the third terminal is configured to supply the third signal using the second signal, and the fourth terminal is configured to supply the fourth signal using the second signal, when the coupler is in a reception mode.

* * * * *